United States Patent
Ge (10) Patent No.: US 9,970,400 B2
(45) Date of Patent: May 15, 2018

(54) FUEL ADMISSION VALVE FOR PRE-CHAMBER

(71) Applicant: Caterpillar Inc., Peoria, IL (US)

(72) Inventor: Xinyu Ge, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 226 days.

(21) Appl. No.: 14/854,611

(22) Filed: Sep. 15, 2015

(65) Prior Publication Data

US 2017/0074224 A1 Mar. 16, 2017

(51) Int. Cl.
| | | |
|---|---|---|
| F02M 61/14 | (2006.01) | |
| F02M 61/06 | (2006.01) | |
| F02B 19/12 | (2006.01) | |
| F02B 19/10 | (2006.01) | |
| F02M 61/08 | (2006.01) | |
| F02M 63/00 | (2006.01) | |
| F02M 57/06 | (2006.01) | |

(52) U.S. Cl.
CPC ........... *F02M 61/06* (2013.01); *F02B 19/108* (2013.01); *F02B 19/12* (2013.01); *F02M 57/06* (2013.01); *F02M 61/08* (2013.01); *F02M 63/0007* (2013.01)

(58) Field of Classification Search
CPC ........ F02M 61/06; F02M 57/06; F02M 61/08; F02M 63/0007; F02B 19/108; F02B 19/12
USPC ....... 123/297, 475, 150, 208, 267, 274, 277, 123/256, 260, 266, 287, 37; 239/533.7, 239/584, 453; 219/264; 701/103
See application file for complete search history.

(56) References Cited

U.S. PATENT DOCUMENTS

| | | | | |
|---|---|---|---|---|
| 5,715,788 | A | * | 2/1998 | Tarr ...................... F02M 57/06 |
| | | | | 123/297 |
| 5,791,374 | A | * | 8/1998 | Black .................. F02B 19/1033 |
| | | | | 123/267 |
| 6,131,606 | A | | 10/2000 | O'Neill |
| 6,390,121 | B1 | | 5/2002 | Steinruck et al. |
| 6,431,472 | B1 | | 8/2002 | Tian et al. |
| 6,575,192 | B1 | | 6/2003 | Shaffer |
| 6,584,958 | B2 | | 7/2003 | Rahardja et al. |
| 8,820,712 | B2 | | 9/2014 | Miura et al. |

(Continued)

FOREIGN PATENT DOCUMENTS

| | | |
|---|---|---|
| DE | 102008017252 A1 | 10/2009 |
| EP | 1106817 | 6/2001 |

(Continued)

*Primary Examiner* — Lindsay Low
*Assistant Examiner* — John Bailey
(74) *Attorney, Agent, or Firm* — James S. Bennin (57) ABSTRACT

A pre-chamber fuel admission valve includes a fuel inlet, a fuel outlet, an actuated valve, and a check valve. The fuel inlet receives a supply of a fuel. The fuel outlet delivers the fuel to a pre-chamber. The actuated valve is between and in fluid communication with the fuel inlet and the fuel outlet. The actuated valve controls a flow of the fuel from the fuel inlet to the fuel outlet. The check valve is biased in a closed position and between and in fluid communication with the actuated valve and the fuel outlet. The check valve is configured to open and allow the fuel to exit the fuel outlet in response to a fuel pressure exceeding a pre-chamber pressure plus a bias pressure, and the check valve is configured to close in response to the pre-chamber pressure plus the bias pressure exceeding the fuel pressure.

20 Claims, 4 Drawing Sheets

(56) References Cited

U.S. PATENT DOCUMENTS

| | | |
|---|---|---|
| 8,870,152 B2 | 10/2014 | Nagata et al. |
| 8,998,115 B2 | 4/2015 | Salcedo et al. |
| 2011/0214639 A1* | 9/2011 | Ishida ................... F01P 3/16 |
| | | 123/275 |
| 2014/0190437 A1 | 7/2014 | Chiera et al. |
| 2015/0204232 A1* | 7/2015 | Hanson ............. F02B 19/1085 |
| | | 123/275 |

FOREIGN PATENT DOCUMENTS

| | | |
|---|---|---|
| EP | 2011995 | 1/2009 |
| EP | 2372135 | 10/2011 |
| JP | 2011149308 A | 8/2011 |
| WO | 2012158153 | 11/2012 |
| WO | 2014147978 A1 | 9/2014 |

\* cited by examiner

FUEL ADMISSION VALVE FOR PRE-CHAMBER

TECHNICAL FIELD

The present disclosure relates generally to fuel systems and, more particularly, to an injector or fuel admission valve for a pre-combustion chamber or pre-chamber in an internal combustion engine.

BACKGROUND

Internal combustion engines may include an ignition system to ignite a mixture of fuel and oxidizer within a combustion chamber of the engine. Such ignition systems may include a pre-chamber, in which a small charge of fuel and oxidizer is ignited initially and then the partially burned products of this initial charge are forced from the pre-chamber into a main combustion chamber via nozzles or channels to ignite the main charge in the main combustion chamber.

An exemplary pre-chamber combustion system employing a pre-chamber to ignite a main combustion chamber of an engine is described in U.S. Pat. No. 8,857,405 ("the '405 patent"), issued Oct. 14, 2014. The pre-chamber combustion system described in the '405 patent includes a pre-chamber fuel admission valve and spark plug disposed within a pre-chamber that is fluidly connected to the combustion chamber. Ignition of the fuel-oxidizer mixture in the pre-chamber forces partially burned fuel into the combustion chamber and ignites a main fuel charge in the combustion chamber.

While the system of the '405 patent may be configured to provide a dispersed ignition of the main fuel charge in the combustion chamber, such systems may have drawbacks. For example, the pre-chamber fuel admission valve may be subject to relatively high temperatures and pressures present in the combustion chamber, and this harsh environment may limit the useful life of the pre-chamber fuel admission valve. For example, wear at the fuel admission valve of the pre-chamber injector may result in backflow from the pre-chamber through the fuel admission valve. If left unchecked, this backflow through the pre-chamber fuel admission valve can cause engine performance issues and other unwanted effects on the combustion process within the engine.

Accordingly, there is a need for improved pre-chamber combustion systems to address the problems described above and/or problems posed by other conventional approaches.

It will be appreciated that this background description has been created to aid the reader, and is not a concession that any of the indicated problems were themselves known previously in the art.

SUMMARY

Aspects of the disclosure are capable of providing improved pre-chamber combustion systems.

An aspect of the disclosure pertains to a pre-chamber fuel admission valve. The pre-chamber fuel admission valve includes a fuel inlet, a fuel outlet, an actuated valve, and a check valve. The fuel inlet is configured to receive a supply of a fuel. The fuel outlet is configured to deliver the fuel to a pre-chamber. The actuated valve is disposed between and in fluid communication with the fuel inlet and the fuel outlet. The actuated valve is configured to control a flow of the fuel from the fuel inlet to the fuel outlet. The check valve is disposed between and in fluid communication with the actuated valve and the fuel outlet. The check valve is biased in a closed position. The check valve is configured to open and allow the fuel to exit the fuel outlet in response to a fuel pressure exceeding a pre-chamber pressure plus a bias pressure, and the check valve is configured to close in response to the pre-chamber pressure plus the bias pressure exceeding the fuel pressure.

Another aspect of the disclosure relates to a pre-chamber fuel admission valve. The pre-chamber fuel admission valve includes a fuel inlet, a fuel outlet, an inward opening valve, an actuator, and an outward opening valve. The fuel inlet is configured to receive a supply of a fuel. The fuel outlet is configured to deliver the fuel to a pre-chamber. The inward opening valve is disposed between and in fluid communication with the fuel inlet and the fuel outlet. The inward opening valve is configured to control a flow of the fuel from the fuel inlet to the fuel outlet. The actuator is configured to operate the inward opening valve in response to a signal. The outward opening valve is disposed downstream of the inward opening valve and in fluid communication with the inward opening valve. The outward opening valve is biased in a closed position.

Yet another aspect of the disclosure pertains to a pre-chamber ignition system for pre-ignition. The pre-chamber ignition system includes a pre-chamber, a pre-chamber spark plug, a pre-chamber passageway, and a pre-chamber fuel admission valve. The pre-chamber spark plug is to ignite a pre-chamber charge mixture including a fuel. The pre-chamber passageway is to fluidly connect the pre-chamber to a main combustion chamber. The pre-chamber fuel admission valve is to inject the fuel into the pre-chamber. The pre-chamber fuel admission valve includes a fuel inlet, a fuel outlet, an actuated valve, and a check valve. The fuel inlet is configured to receive a supply of a fuel. The fuel outlet is configured to deliver the fuel to a pre-chamber. The actuated valve is disposed between and in fluid communication with the fuel inlet and the fuel outlet. The actuated valve is configured to control a flow of the fuel from the fuel inlet to the fuel outlet. The check valve is disposed between and in fluid communication with the actuated valve and the fuel outlet. The check valve is biased in a closed position. The check valve is configured to open and allow the fuel to exit the fuel outlet in response to a fuel pressure exceeding a pre-chamber pressure plus a bias pressure, and the check valve is configured to close in response to the pre-chamber pressure plus the bias pressure exceeding the fuel pressure.

It will be understood that the disclosure is not limited in its application to the details of construction and to the arrangements of the components set forth in the following description or illustrated in the drawings. The disclosed device and method are capable of aspects in addition to those described and of being practiced and carried out in various ways. Also, it will be understood that the terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. Therefore, the claims will be regarded as including such equivalent constructions insofar as they do not depart from the spirit and scope of the various aspects.

The drawings presented are intended solely for the purpose of illustration and therefore, are neither desired nor intended to limit the subject matter of the disclosure to any or all of the exact details of construction shown, except insofar as they may be deemed essential to the claims.

DETAILED DESCRIPTION

Figure 1:
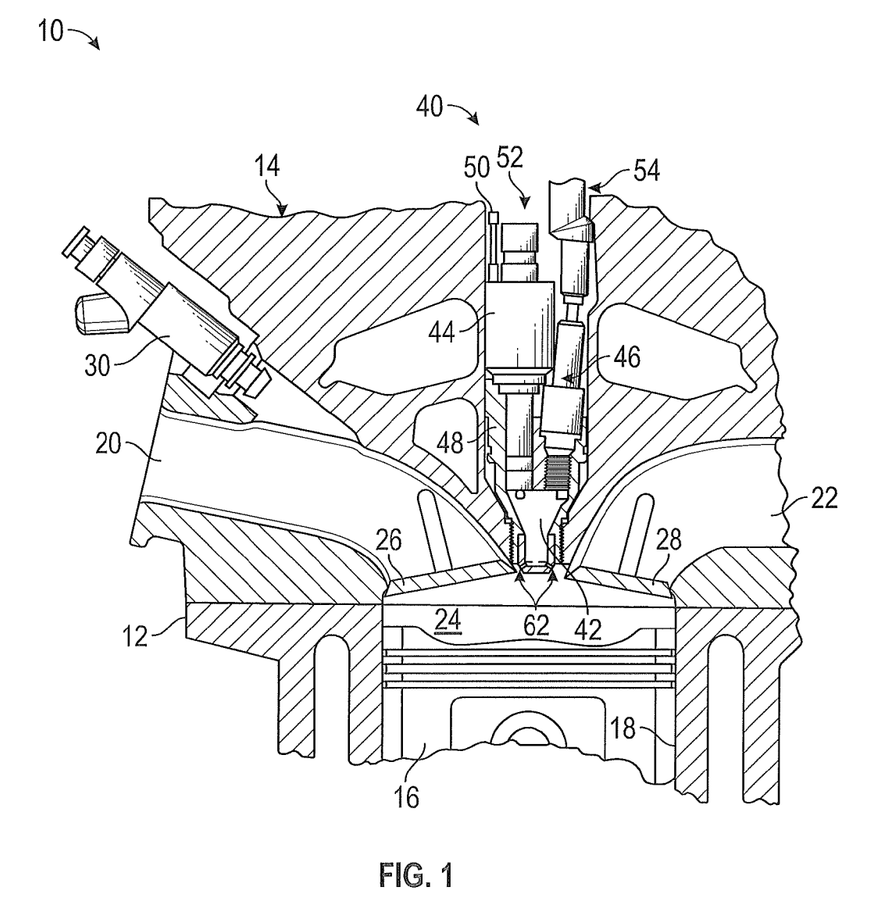
FIG. 1 is a cross sectional view of a pre-chamber ignition system disposed in an engine, according to an aspect of the disclosure.

FIG. 1 is a cross sectional view of an exemplary engine 10. The engine 10 is a combustion engine configured to burn a fuel such as natural gas, methane, gasoline, diesel, suitable alcohols, suitable oils, other suitable combustible fuel known in the art, and mixtures thereof. The engine 10 is operable to provide power for any suitable application. Examples of suitable applications include fixed and mobile applications. Examples of fixed applications include providing power as part of a generator set, pumps, and the like. Examples of mobile applications include providing power for various machines in industries such as, for example, mining, construction, farming, transportation, or another industry known in the art.

The engine 10 includes an engine block 12 and a cylinder head 14. A piston 16 is disposed within a cylinder 18 of the engine 10. The cylinder 18 is defined by the engine block 12 and configured for reciprocal movement of the piston 16 in the cylinder 18. The cylinder head 14 includes an intake port 20 and an exhaust port 22. A combustion chamber 24 is at least partly defined by a top face of the piston 16, walls of the cylinder 18, and a portion of the cylinder head 14 disposed above the cylinder 18. An intake valve 26 regulates fluid flow between the intake port 20 and the combustion chamber 24. An exhaust valve 28 regulates fluid flow between the exhaust port 22 and the combustion chamber 24. The intake valve 26 and the exhaust valve 28 may be controlled to open and close by a cam, a hydraulic actuator, or any other valve actuator known in the art, to allow a fuel/oxidizer mixture into the combustion chamber 24 and allow combustion gasses out of the combustion chamber 24, respectively.

Main fuel may be introduced to a flow of oxidizer via a fuel injector 30. The fuel injector 30 may be in fluid connection with the intake port 20 and is configured to inject a measured mass of fuel that is commensurate with a corresponding mass of air being conveyed through the intake port 20. This fuel/oxidizer mixture is introduced into the cylinder 18 during an intake portion of the engine cycle. For example, while the piston 16 is moving downward in the cylinder 18, the exhaust valve 28 is closed, and the intake valve 26 is open, the fuel/air mixture flows into the cylinder 18. Once this stroke is completed, the intake valve 26 is also closed and the fuel/air mixture is compressed by the piston 16 returning to the top of the cylinder 18. At a particular point in the engine cycle, this compressed fuel/air mixture is ignited.

As shown in FIG. 1, the engine 10 is suitable for use with a pre-chamber ignition system 40. The pre-chamber ignition system 40 is configured to provide ignition for the fuel/air mixture in the combustion chamber 24. The pre-chamber ignition system 40 includes a pre-chamber 42, a pre-chamber fuel admission valve 44, a pre-chamber spark plug 46, and a pre-chamber housing 48. The pre-chamber 42 is in fluid connection with the combustion chamber 24. The pre-chamber fuel admission valve 44 is in fluid connection with the pre-chamber 42. The pre-chamber fuel admission valve 44 includes a fuel inlet 50 and a contact 52. The fuel inlet 50 provides a supply of fuel to the pre-chamber fuel admission valve 44 and the contact 52 is configured to receive a control signal to control the pre-chamber fuel admission valve 44 to inject the fuel into the pre-chamber 42. The pre-chamber spark plug 46 is configured to generate a spark in the pre-chamber 42 in response to a current provided by a spark plug wire 54. Alternatively or additionally, other ignition energy sources, such as a laser or a plasma generator, may be incorporated into the pre-chamber ignition system 40.

A pre-chamber charge of fuel is introduced into the pre-chamber 42 via the pre-chamber fuel admission valve 44. It will be appreciated that oxidizer may flow into the pre-chamber 42 from the combustion chamber 24 via convection induced by charge motion within the combustion chamber 24, convection induced by a pressure difference between the pre-chamber 42 and the combustion chamber 24, diffusion, or combinations thereof. The pre-chamber spark plug 46 is configured to ignite the pre-chamber charge mixture of fuel and oxidizer. In response to ignition, gasses in the pre-chamber 42 rapidly heat and expand such that flames and/or hot combustion gasses are driven into the combustion chamber 24 to ignite the fuel/air mixture in the combustion chamber 24.

Figure 2:
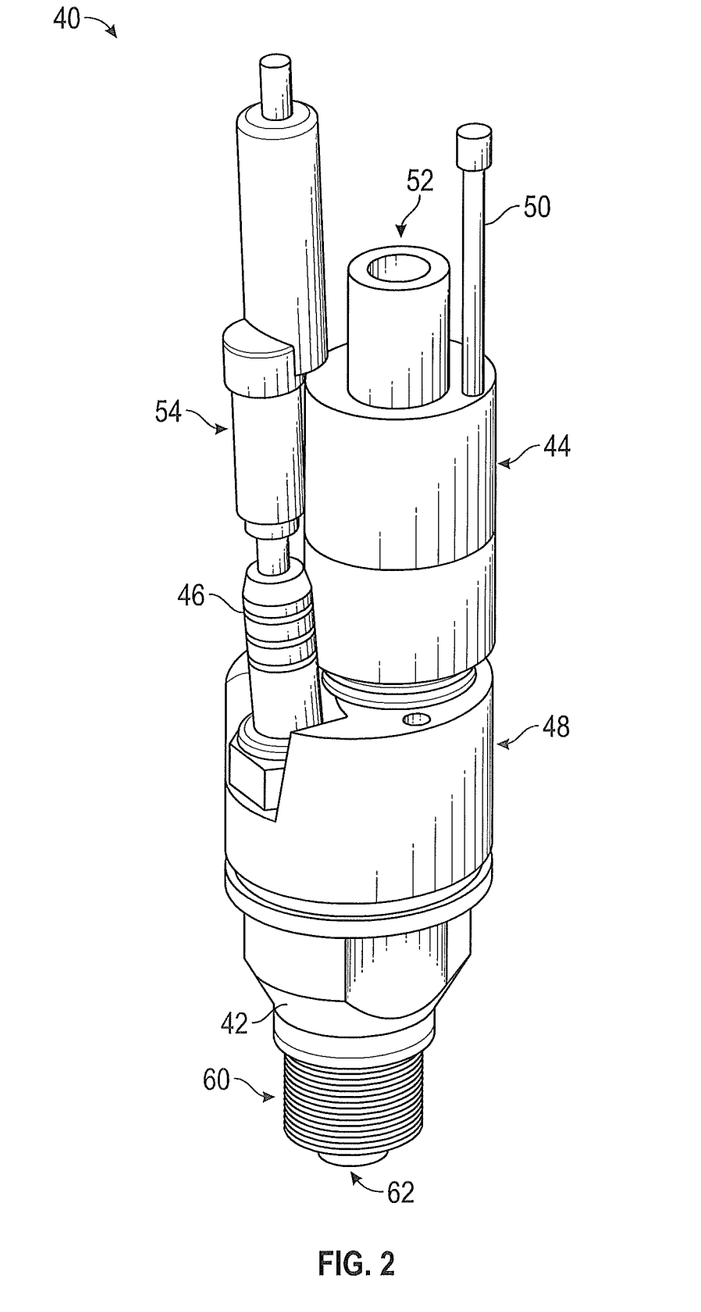
FIG. 2 is a perspective view of a pre-chamber ignition system, according to an aspect of the disclosure.

FIG. 2 is a perspective view of the pre-chamber ignition system 40, according to an aspect of the disclosure. As shown in FIG. 2, the pre-chamber ignition system 40 includes the pre-chamber fuel admission valve 44 and the pre-chamber spark plug 46 assembled in the pre-chamber housing 48. The pre-chamber 42 is disposed at a lower portion of the pre-chamber housing 48. The pre-chamber housing 48 may also include a threaded portion 60 configured to mate with a matching threaded bore disposed in the cylinder head 14. In addition, the pre-chamber housing 48 may include a pre-chamber outlet 62 to fluidly connect the pre-chamber 42 with the combustion chamber 24. In various examples, the pre-chamber outlet 62 may include one or more orifices.

Figure 3:
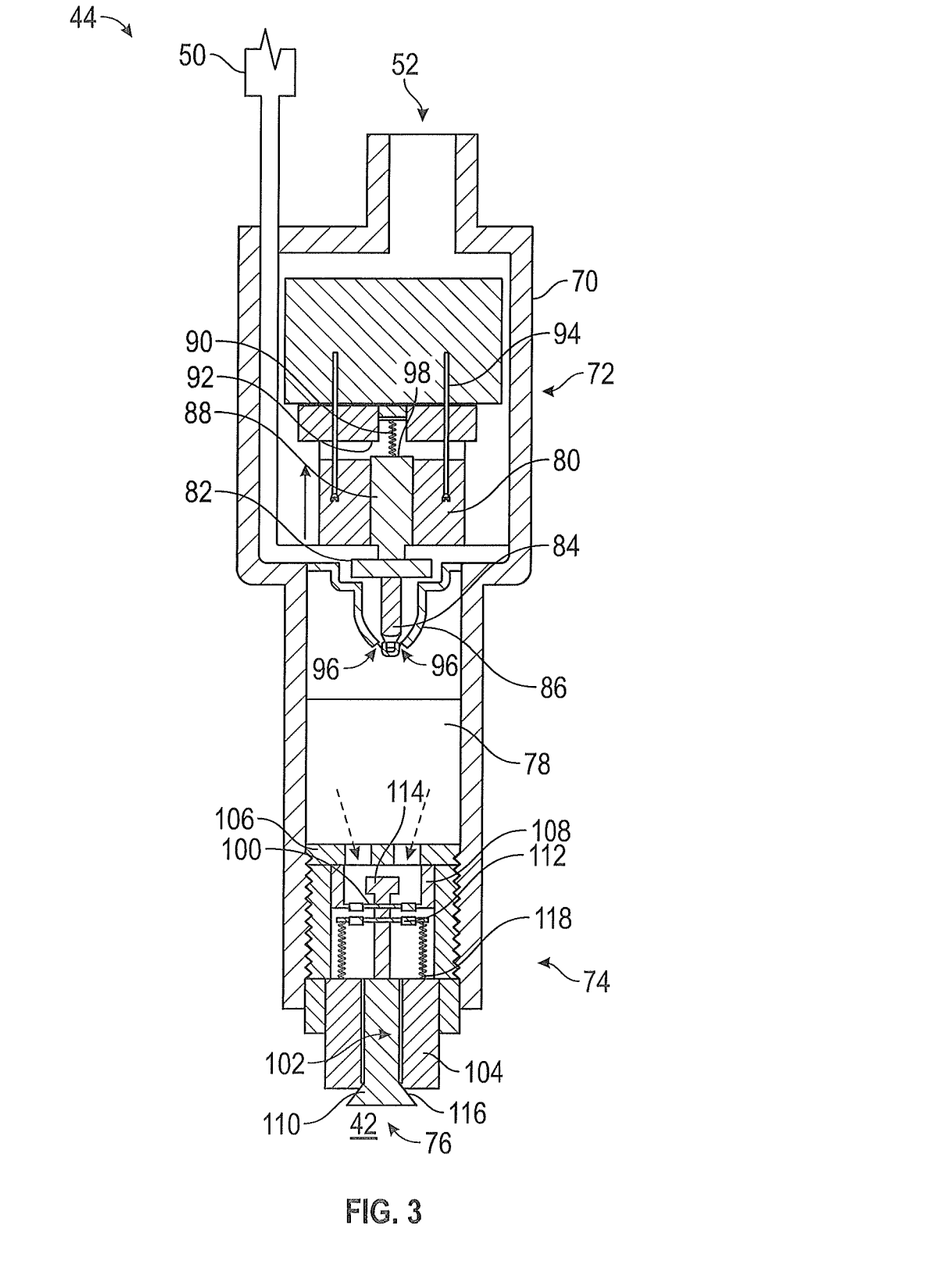
FIG. 3 is a cross sectional view of a pre-chamber fuel admission valve, according to an aspect of the disclosure.

FIG. 3 is a cross sectional view of the pre-chamber fuel admission valve 44, according to an aspect of the disclosure. As shown in FIG. 3, the pre-chamber fuel admission valve 44 includes the fuel inlet 50, the contact 52, a fuel admission housing 70, a solenoid valve 72, a check valve 74, a fuel outlet 76, and an internal chamber 78. The solenoid valve 72 may include a coil 80, an armature 82, a plunger 84, a valve body 86, a connecting rod 88, a spring 90, a valve stop 92, one or more pins 94, and a connecting rod bearing surface 98. In response to being energized, the coil 80 is configured to urge the armature 82 upward (relative to the illustration in FIG. 3) against the force of the spring 90 which biases the solenoid valve 72 toward the closed position. The plunger 84 is affixed to the armature 82 and is drawn out from the valve body 86 in response to the upward movement of the armature 82. The upward movement of the plunger 84 unseals the plunger 84 from the valve body 86 to allow fuel from the fuel inlet to flow through one or more orifices 96 disposed in the valve body 86. A stroke range of the solenoid valve 72 is defined by the distance the plunger 84 moves between a closed position and a point at which the connecting rod bearing surface 98 bears against the valve stop 92.

When the coil 80 is de-energized, the spring 90 urges the armature 82 downward and the plunger 84 is urged into the valve body 86 to seal the solenoid valve 72. Pressure of the fuel from the fuel inlet 50 urges the plunger 84 into the valve body 86. As such, the solenoid valve 72 is configured to reduce or prevent leakage of the fuel past the solenoid valve 72 and into the internal chamber 78.

While a solenoid valve is shown and described, any suitable actuated valve may be utilized by the pre-chamber fuel admission valve 44 according to various aspects of the disclosure. For example, a pneumatically, hydraulically, or mechanically actuated valve may substitute for the solenoid described herein.

The check valve 74 is in fluid communication with the internal chamber 78 and facilitates a unidirectional flow of fuel from the internal chamber 78 to the pre-chamber 42. The check valve 74 may include a stop plate 100, a pintle assembly 102, and a lower portion 104. The stop plate 100 may be secured within the check valve 74 via a top plate 106 and one or more connection members 108. The pintle assembly 102 may include a pintle shaft 110, a spring plate 112, a valve stop 114, a conical sealing member 116, or combinations thereof. The spring plate 112 is secured to the pintle shaft 110 and provides a bearing surface upon which a biasing member, such as a spring 118, may bear to bias the check valve 74 in the closed position. The valve stop 114 is disposed at a proximal end of the pintle shaft 110 and provides a stop for the pintle assembly 102 in the open position by bearing upon the stop plate 100. The conical sealing member 116 is disposed at a distal end of the pintle shaft 110 and is configured to generate a seal at the fuel outlet 76.

In response to a fuel pressure in the internal chamber 78 being greater than a combination of a pressure in the pre-chamber 42 plus a pressure of the spring 118, the pintle assembly 102 is urged downward (relative to the illustration in FIG. 3) to open the check valve 74 at the fuel outlet 76. In response to the fuel pressure in the internal chamber 78 being less than the combination of the pressure in the pre-chamber 42 plus the pressure of the spring 118, the pintle assembly 102 is urged upward to close the check valve 74 at the fuel outlet 76. In this manner, the check valve 74 automatically prevents backflow of gasses into the pre-chamber fuel admission valve 44 in response to the pressure in the pre-chamber 42 exceeding the fuel pressure in the internal chamber 78 minus the pressure of the spring 118. In addition, the check valve 74 is configured to seal more tightly in response to an increase of pressure in the pre-chamber 42.

INDUSTRIAL APPLICABILITY

The present disclosure may be applicable to any engine driven by internal combustion. Aspects of the disclosed pre-chamber ignition system and method may promote improved sealing performance in both delivery and backflow prevention directions, decrease stress on components of the pre-chamber fuel admission valve, decrease maintenance costs and improve ability to remanufacture the pre-chamber fuel admission valve, and improve functionality, operational flexibility, performance, and energy efficiency of engine systems and engine performance.

Pre-chamber exposure to high temperatures and vibration may diminish pre-chamber functionality over time. In addition, combustion residues and particulate matter in the fuel supply lines can accelerate wear of the check valve. Given the manufacturing tolerance, a relatively large portion of the engine cycle is assigned as a valve-closed condition to prevent the backflow. Consequently, the operating window for injecting fuel from the electronically controlled pre-chamber fuel admission valve is shortened. Also, increasing the useful life of a pre-chamber fuel admission valve would help to decrease overall engine life cycle cost.

In addition, composition of the fuel delivered to the engine 10, and therefore combustion characteristics of the fuel delivered to the engine 10, may vary with location of the engine 10, time of operation, or both. For example, some field natural gas may include 85% $CH_4$ and 15% $CO_2$, while the natural gas delivered by pipeline includes 98% $CH_4$ and 2% $CO_2$. Accordingly, the heating value of field natural gas may be lower than the heating value of pipeline natural gas, and in turn, a larger volume of field natural gas may need to be delivered to the engine 10 to effect the same power output as when the engine 10 is fueled with pipeline natural gas, for example.

Figure 4:
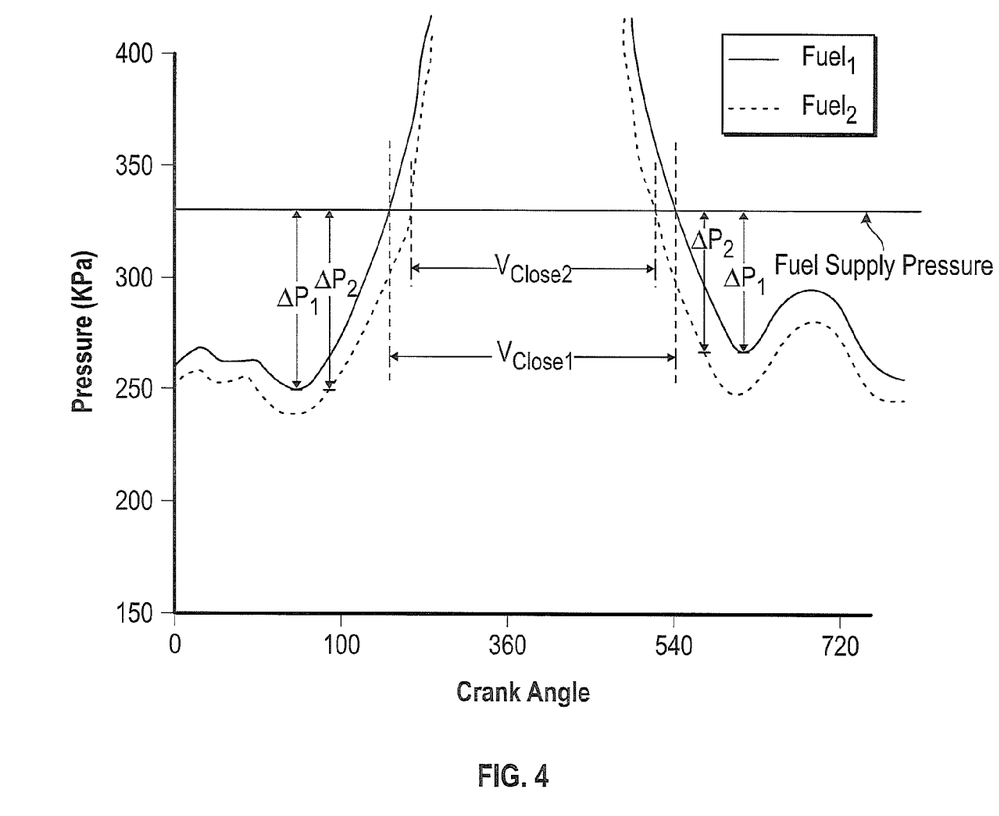
FIG. 4 is a graph of cylinder pressure and fuel supply pressure as a function of crank angle, according to an aspect of the disclosure.

FIG. 4 illustrates the pressure difference (hereinafter "delta P" or "$\Delta P$") and operating window for a pre-chamber fuel admission valve operating with fuels having different compositions. From a control perspective, it is desirable to have a longer valve-open window available to allow sufficient fuel delivery when natural contents changes. However a longer valve-open condition of the electronically controlled pre-chamber fuel admission valve may also lead to increased backflow through the check valve in a direction from the fuel outlet toward the fuel inlet. In particular, a valve-open condition should not extend into a time period in which the pressure in the combustion chamber exceeds the fuel supply pressure in order to prevent backflow. For example, when the piston moves towards top dead center, the pressure of the mixture in the pre-chamber increases, and at certain crank angle, the pressure of the mixture in the pre-chamber is greater than the fuel supply pressure and negative delta pressure occurs. It is important to deactivate the solenoid before this crank angle to avoid the backflow. As shown in FIG. 4, with $fuel_1$, $\Delta P_1$ increases more quickly and decreases more slowly as compared to $fuel_2$ and its associated $\Delta P_2$. Consequently, a valve-closed period for $fuel_1$ ($V_{close1}$) is relatively longer than for $fuel_2$ ($V_{close2}$). Given a supply fuel pressure that remains constant, the $fuel_1$ has a shorter valve-open window. However, either fuel may be used in the field and therefore the longer valve-closed period is used in conventional system to calibrate the engine cycle in order to reduce the potential for backflow. It is an advantage that the pre-chamber fuel admission valve 44 may be calibrated to use the shorter valve-closed period because the check valve 74 automatically closes prior to the delta P of the cylinder pressure being equal to the fuel supply pressure. In this manner, increased engine performance may be gained when using some fuel formulations and/or negative engine performance may be avoided.

According to an aspect of the disclosure, with reference to FIGS. 1, 2, and 3, energizing the coil 80 in the solenoid valve 72 increases pressure against the action of the spring 90, and the solenoid valve 72 opens. In response to the solenoid valve 72 being open, the fuel flows into the internal chamber 78 and urges the check valve 74 to open. In response to the fuel pressure in the internal chamber 78 being greater than the combination of a pressure in the pre-chamber 42 plus the pressure of the spring 118, the check valve 74 is opened and fuel enters the pre-chamber 42 via the fuel outlet 76. When the coil 80 is de-energized, the solenoid valve 72 is urged to close by the force of the spring 90 The check valve 74 is closed in response to the combined forces of the spring 118 and the force exerted by the mixture in the pre-chamber 42 exceed the force exerted by the internal chamber 78.

In order to achieve accurate control of pre-chamber fuel delivery and ensure consistence of the pre-chamber fuel delivery, both the solenoid valve 72 and the check valve 74 are utilized in the pre-chamber fuel admission valve 44.

In operation, the solenoid valve 72 includes a check valve function configured to reduce or prevent leakage of fuel from the fuel inlet 50 out the fuel outlet 76. As such, in more general terms, the pre-chamber fuel admission valve 44 includes two check valves operating together to both prevent leakage of fuel into the pre-chamber 42 and prevent backflow into the pre-chamber fuel admission valve 44. These two check valves work in concert to prevent uncontrolled flow in both directions through the pre-chamber fuel admission valve 44. The first check valve is the solenoid valve 72. The solenoid valve 72 opens by moving the plunger 84 inwardly relative to the pre-chamber fuel admission valve 44 or away from the pre-chamber 42 (moves up in FIG. 3). The second check valve is the check valve 74. The check valve 74 opens by the pintle assembly 102 moving outwardly relative to the pre-chamber fuel admission valve 44 or towards the pre-chamber 42 (FIG. 3). The basic function of the pre-chamber fuel admission valve 44 is given below.

When the coil 80 is activated, the armature 82 moves away from the valve body 86 due to the electromagnetic force and the solenoid valve 72 is opened. The stroke range of the solenoid valve 72 is the distance the plunger 84 moves between the open position and the closed position and is defined by the distance the plunger 84 moves between the closed position and the point at which the connecting rod bearing surface 98 bears against the valve stop 92. The solenoid valve 72 is biased towards the close position by spring 90. As shown in FIG. 3, when the pressure difference between the fuel inlet 50 and the pre-chamber 42 increases (delta p increase) to the point of becoming a net positive delta P, the preloaded force of the spring 90 can be decreased proportionally, and hence the fuel admission valve can be utilized with high fuel supply pressure. Positive delta P also pushes down the plunger 84 and improves sealing performance. The design prevents the fuel (e.g., natural gas) from leaking into the internal chamber 78 and further leaking into the pre-chamber 42.

One challenge for the solenoid valve 72 is to avoid backflow in a direction from the outlet of the solenoid valve 72 toward the inlet of the solenoid valve. For example, a potential for backflow may occur when the pressure in the pre-chamber 42 increases due to the piston 16 moving toward top dead center and this backflow potential may increase as fuel combustion in the combustion chamber 24 takes place. While the spring 90 is configured to reduce backflow in some instances, the spring 90 may not be sufficient to produce enough force to avoid backflow. In order to avoid the backflow, the check valve 74 is included in the pre-chamber fuel admission valve 44. When the fuel such as a compressed gas enters the internal chamber 78, the compressed gas exerts pressure on the check valve 74. The check valve 74 is an outwardly open valve. That is, the pintle assembly 102 moves away or outward from the check valve 74 to open in response to the pressure in the internal chamber 78 exceeding the combination of force of the spring 118 and pressure in the pre-chamber 42. When the pintle assembly 102 moves towards the pre-chamber 42, the check valve 74 is opened.

The check valve 74 is biased toward a closed position by the spring 118. One side of the spring 118 bears upon the lower portion 104 of the check valve 74, and the other side of the spring 118 bears upon the spring plate 112. The spring plate 112 is connected with the pintle assembly 102 and moves with the pintle assembly 102. The check valve 74 can effectively avoid the back flow due to the conical shape of the conical sealing member 116 that acts as a forcing cone to increase sealing power in response to increased pressure. The design of the check valve 74 provides unidirectional flow out of the fuel outlet 76 and good sealing performance against flow in the opposite direction (e.g., backflow). When the pressure in the pre-chamber 42 increases and the combined forces of the pressure in the pre-chamber 42 plus the force of the spring 118 becomes greater than the pressure in the internal chamber 78, the check valve 74 is configured to automatically close and avoid the backflow of gasses into the pre-chamber fuel admission valve 44.

Another advantage of the pre-chamber fuel admission valve 44 is that the internal chamber 78 dramatically reduces heat transfer from the pre-chamber 42 to the coil 80 of the solenoid valve 72. That is, by moving the coil 80 further from the pre-chamber 42 and the combustion chamber 24, heat transfer to the coil 80 is reduced. In this manner, the useful life of the solenoid valve 72, and therefore the pre-chamber fuel admission valve 44, may be improved. A further advantage is the improved serviceability of the pre-chamber fuel admission valve 44. In this regard, while the check valve 74 is still exposed to high thermal stress, the check valve 74 may be replace with relative ease and without recalibration of the solenoid valve 72. That is, since the precise control is managed by the solenoid valve 72, the check valve 74 replacement does not require re-calibration. The design makes the pre-chamber fuel admission valve 44 more serviceable.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified.

I claim:

1. A pre-chamber fuel admission valve comprising:
   a fuel inlet configured to receive a supply of a fuel;
   a fuel outlet configured to deliver the fuel to a pre-chamber;
   an actuated valve disposed between and in fluid communication with the fuel inlet and the fuel outlet, the actuated valve being configured to control a flow of the fuel from the fuel inlet to the fuel outlet,
   the actuated valve including a plunger; and
   a check valve disposed between and in fluid communication with the actuated valve and the fuel outlet, the check valve being biased in a closed position,
   the check valve including an assembly, wherein the actuated valve opens by moving the plunger inwardly relative to the pre-chamber fuel admission valve to prevent leakage of fuel into the pre-chamber, and wherein the check valve opens by moving the assembly outwardly relative to the pre-chamber fuel admission valve to prevent backflow into the pre-chamber fuel admission valve, wherein the check valve is configured to open and allow the fuel to exit the fuel outlet in response to a fuel pressure exceeding a pre-chamber pressure plus a bias pressure, and the check valve is configured to close in response to the pre-chamber pressure plus the bias pressure exceeding the fuel pressure.

2. The pre-chamber fuel admission valve according to claim 1, further comprising:
an annular sealing surface disposed about the fuel outlet; and
a conical sealing member configured to mate with the annular sealing surface to close the check valve.

3. The pre-chamber fuel admission valve according to claim 2, further comprising a pintle assembly configured to translate axially within a check valve central bore, the pintle assembly including a pintle shaft with the conical sealing member disposed at a distal end of the pintle shaft.

4. The pre-chamber fuel admission valve according to claim 3, further comprising:
a stop plate disposed in the check valve and defining a stop plate bore therethrough, the pintle shaft extending through the stop plate bore; and
a valve stop disposed at a proximal end of the pintle shaft, wherein a full open position of the check valve is defined by a position of the pintle shaft relative to the valve stop at which the valve stop contacts the stop plate.

5. The pre-chamber fuel admission valve according to claim 4, further comprising:
a nose piece having an outlet bore and an interior bearing surface, the outlet bore having a surface defining a pintle shaft passageway configured to allow the pintle shaft to translate along a longitudinal axis of the pintle shaft passageway;
a spring plate disposed in the check valve, the spring plate being secured to the pintle shaft; and
a biasing member disposed between the spring plate and the interior bearing surface of the nose piece.

6. The pre-chamber fuel admission valve according to claim 1, wherein the actuated valve is controlled to form an actuated valve seal to stop the flow of the fuel from the fuel inlet to the fuel outlet, and
wherein a closing force exerted on the actuated valve seal is equal to a closing force of the actuated valve plus a difference between an upstream fuel pressure and a downstream fuel pressure.

7. The pre-chamber fuel admission valve according to claim 6, wherein the pre-chamber fuel admission valve is configured to prevent leakage of the fuel through the actuated valve, and the pre-chamber fuel admission valve is configured to prevent a backflow through the check valve in a direction from the fuel outlet toward the fuel inlet.

8. A pre-chamber fuel admission valve comprising:
a fuel inlet configured to receive a supply of a fuel;
a fuel outlet configured to deliver the fuel to a pre-chamber;
an inward opening valve disposed between and in fluid communication with the fuel inlet and the fuel outlet, the inward opening valve being configured to control a flow of the fuel from the fuel inlet to the fuel outlet;
an actuator configured to operate the inward opening valve in response to a signal; and
an outward opening valve disposed downstream of the inward opening valve and in fluid communication with the inward opening valve, the outward opening valve being biased in a closed position,
wherein the inward opening valve opens inwardly relative to the pre-chamber fuel admission valve to prevent leakage of fuel into a pre-chamber, and
wherein the outward opening valve opens outwardly relative to the pre-chamber fuel admission valve to prevent backflow into the pre-chamber fuel admission valve.

9. The pre-chamber fuel admission valve according to claim 8, wherein a closing force acting on the inward opening valve is provided by a positive delta pressure of an upstream fuel pressure relative to a downstream fuel pressure.

10. The pre-chamber fuel admission valve according to claim 8, wherein the outward opening valve is configured to automatically close in response to a pre-chamber pressure plus a bias pressure exceeding a fuel pressure.

11. The pre-chamber fuel admission valve according to claim 8, further comprising:
an annular sealing surface disposed about the fuel outlet; and
a conical sealing member configured to mate with the annular sealing surface to close the outward opening valve.

12. The pre-chamber fuel admission valve according to claim 11, further comprising:
a pintle assembly configured to translate longitudinally within an outward opening valve central bore, the pintle assembly including a pintle shaft with the conical sealing member disposed at a distal end of the pintle shaft.

13. The pre-chamber fuel admission valve according to claim 8, wherein the actuator is a solenoid.

14. A pre-chamber ignition system for pre-ignition, the pre-chamber ignition system comprising:
a pre-chamber;
a pre-chamber spark plug to ignite a pre-chamber charge mixture including a fuel;
a pre-chamber passageway to fluidly connect the pre-chamber to a main combustion chamber; and
a pre-chamber fuel admission valve to inject the fuel into the pre-chamber, the pre-chamber fuel admission valve including:
a fuel inlet configured to receive a supply of the fuel;
a fuel outlet configured to deliver the fuel to the pre-chamber;
an actuated valve disposed between and in fluid communication with the fuel inlet and the fuel outlet, the actuated valve being configured to control a flow of the fuel from the fuel inlet to the fuel outlet; and
a check valve disposed between and in fluid communication with the actuated valve and the fuel outlet, the check valve being biased in a closed position,
wherein the actuated valve opens inwardly relative to the pre-chamber fuel admission valve to prevent leakage of fuel into the pre-chamber, and
wherein the check valve opens outwardly relative to the pre-chamber fuel admission valve to prevent backflow into the pre-chamber fuel admission valve, wherein the check valve is configured to open and allow the fuel to exit the fuel outlet in response to a fuel pressure exceeding a pre-chamber pressure plus a bias pressure, and the check valve is configured to close in response to the pre-chamber pressure plus the bias pressure exceeding the fuel pressure.

15. The pre-chamber ignition system according to claim 14, further comprising:
an annular sealing surface disposed about the fuel outlet; and
a conical sealing member configured to mate with the annular sealing surface to close the check valve.

16. The pre-chamber ignition system according to claim 15, further comprising a pintle assembly configured to translate axially within a check valve central bore, the pintle assembly including a pintle shaft with the conical sealing member disposed at a distal end of the pintle shaft.

17. The pre-chamber ignition system according to claim 16, further comprising:
a stop plate disposed in the check valve and defining a stop plate bore therethrough, the pintle shaft extending through the stop plate bore; and
a valve stop disposed at a proximal end of the pintle shaft, wherein a check valve full open position is defined by a position of pintle shaft translation at which the valve stop contacts the stop plate.

18. The pre-chamber ignition system according to claim 17, further comprising:
a nose piece having an outlet bore and an interior bearing surface, the outlet bore having a surface defining a pintle shaft passageway configured to allow the pintle shaft to translate along;
a spring plate disposed in the check valve, the spring plate being secured to the pintle shaft; and
a biasing member disposed between the spring plate and the interior bearing surface of the nose piece.

19. The pre-chamber ignition system according to claim 14, wherein the actuated valve is controlled to form an actuated valve seal to stop the flow of the fuel from the fuel inlet to the fuel outlet and wherein a closing force exerted on the actuated valve seal is equal to a closing force of the actuated valve plus a difference between an upstream fuel pressure and a downstream fuel pressure.

20. The pre-chamber ignition system according to claim 19, wherein the pre-chamber fuel admission valve is configured to prevent leakage of the fuel through the actuated valve and the pre-chamber fuel admission valve is configured to prevent a backflow through the check valve.

* * * * *